M. P. WETMORE.
APPARATUS FOR MAKING LEADING-IN WIRES FOR INCANDESCENT LAMPS.
APPLICATION FILED OCT. 21, 1918.

1,359,135.   Patented Nov. 16, 1920.

M. P. WETMORE.
APPARATUS FOR MAKING LEADING-IN WIRES FOR INCANDESCENT LAMPS.
APPLICATION FILED OCT. 21, 1918.

1,359,135.

Patented Nov. 16, 1920.
6 SHEETS—SHEET 3.

Inventor
Miner P. Wetmore
By his Attorney

UNITED STATES PATENT OFFICE.

MINER P. WETMORE, OF NEWARK, NEW JERSEY, ASSIGNOR TO HYGRADE ENGINEERING CO. INC., A CORPORATION OF NEW JERSEY.

APPARATUS FOR MAKING LEADING-IN WIRES FOR INCANDESCENT LAMPS 1,359,135.  Specification of Letters Patent.  Patented Nov. 16, 1920.

Application filed October 21, 1918. Serial No. 259,023.

*To all whom it may concern:*

Be it known that I, MINER P. WETMORE, a citizen of the United States of America, residing at Newark, county of Essex, State of New Jersey, have invented certain new and useful Improvements in Apparatus for Making Leading-In Wires for Incandescent Lamps, of which the following is a specification.

My invention relates generally to the manufacture of leading-in wires as practised in the manufacture of incandescent electric lamps. These wires pass through the glass of the lamp stems and are sealed therein, so as to leave outwardly projecting portions to which the contact devices in the lamp bases can be connected for putting the lamps in circuit with an external source of current supply, and also inwardly projecting portions which are "tubulated" or otherwise prepared for being conveniently connected to the incandescing filaments inside the lamps.

More specifically my invention relates to the manufacture of that type of leading-in wires known as leads or "welds,"—this term being employed because these leading-in wires are usually formed by butt-welding together the ends of two sections of wire, one of which sections is composed of a metal or metals or alloy which has about the same coefficient of expansion under heat as the glass into which it is to be fused, while the other (designed to project into the lamp and support the filament therein) is of a different metal, such as nickel. This welding operation has heretofore generally been performed by hand and is a rather slow and delicate one. Also the usual "tubulating" of the free end of the nickel section by flattening it out and then curving the flattened portion on itself to form a little cup at the extremity of the wire, is a somewhat costly operation.

Furthermore, the welded end of the nickel section is usually allowed in manufacture to extend into the glass of the lamp seal and, as nickel has a much higher coefficient of expansion under heat than glass has, many lamps have failed from cracking of the seal on test or on initial use. Especially is this true of the small but high powered lamps used for automobile headlights, as that type of lamp gets very hot in use.

My invention overcomes these difficulties by producing a machine capable of rapidly and cheaply making leading-in wires out of short sections of nickel (or other metal) tubing, pinched on to the ends of sections of solid wire having a proper rate of expansion under heat, instead of being welded thereto. One form of apparatus embodying my invention is illustrated in the accompanying six sheets of drawings in which:

Fig. 13 is a detail, vertical cross section of the wire feeding jaws taken on line 13—13 of Fig. 2, showing the jaws in closed position.

Fig. 14 is a similar view showing the jaws open.

Fig. 15 is a plan view of Fig. 14, parts being broken away.

Throughout the drawings the same reference characters indicate the same parts.

*Main frame and driving mechanism.*

31, is the main frame of the machine in which is journaled the main shaft 2, driven by pulley 1. In that form of my invention here illustrated in which the wire feeding carriage is reciprocated as a whole, this is preferably accomplished through eccentric 3, on shaft 2, and eccentric rod and strap 4, pivotally connected to wire feed carriage 5, at 24. This carriage is supported on the main frame 31, and is movable toward and from it on horizontal guide rods 25, 25.

Motion is transmitted from main shaft 2, through spiral gearing 6, to cam shaft 7, which extends alongside the entire machine. On this shaft are mounted five cams, a tube-cutter cam 8, a wire-cutter cam 9, a wire-gripper cam 10, and wire-feed cams 11 and 210. On the main shaft 2, there are also three cams, a tube-feed cam 12, a cam-slide actuating cam 13, and a reamer operating cam 209. By the properly timed action of these cams the various sub groups of mechanism are automatically put in orderly operation.

*Tube feeding mechanism.*

Figures 2, 7, 8:
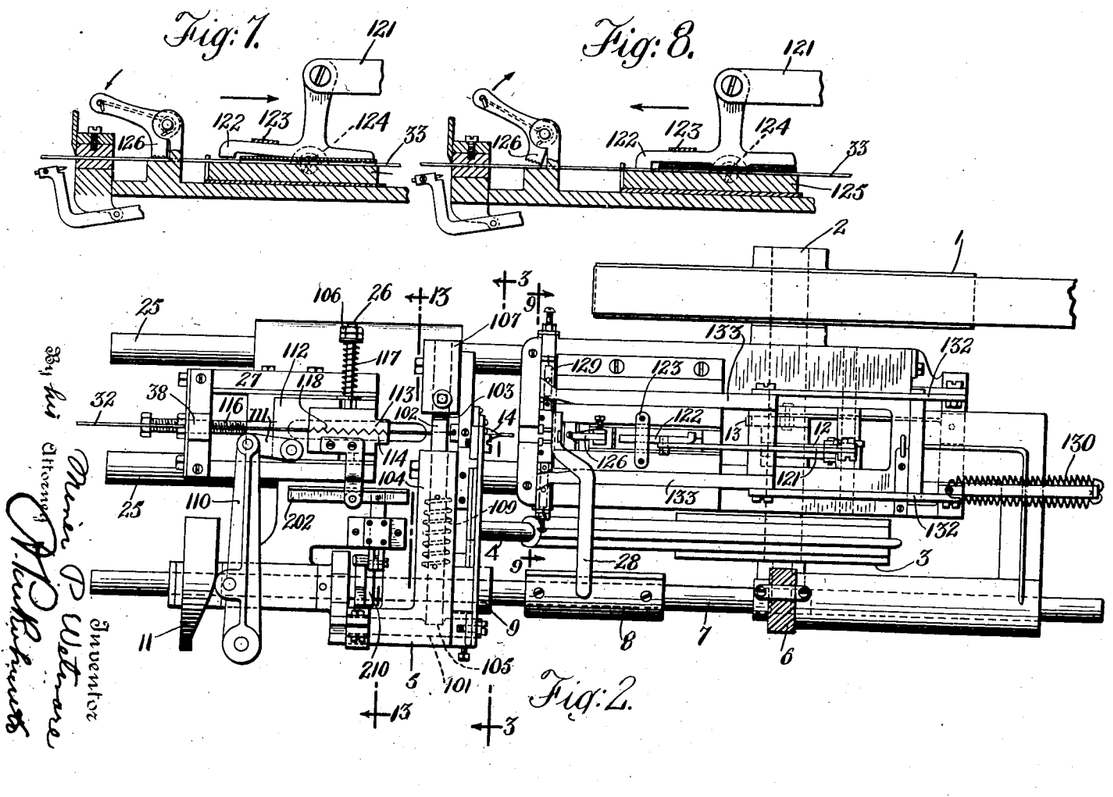
Fig. 2 is a plan view of the same.
Fig. 7 is a detail side elevation and partial vertical section of the tube feeder, the parts being in the positions assumed when the feeder is being retracted in the direction of the arrow, and other parts broken away.
Fig. 8 is a similar view showing the parts in the positions assumed when the apparatus is moving in the direction of the second arrow and feeding the tube forward to the pinchers and cutter.

The nickel tubing 33, is fed in from right to left by the reciprocating friction gripper 122, pivoted to slide 125 at 124, and normally held down by spring 123, against the slide so as to grasp the tube beneath it with a friction grip. This grip is increased during the forward or left hand stroke of the feeder (as indicated in Fig. 8) by the thrust of the driving link 121, pivoted at one end to an upwardly projecting arm on gripper 122, and at the other to the upper end of cam lever 120, pivoted to the main-frame at 34, carrying cam roller 35, and held against cam 12, by spring 36. During the backward, or right hand, stroke of the feeder slide 125, the pull of link 121 tends to lift the gripper as indicated in Fig. 7. During this return motion of the feeding apparatus the tube 33, is held against retrogression by spring friction dog 126, which assumes the position also shown in Fig. 7. During the feeding stroke this dog 126, yields as indicated in Fig. 8. The pin and slot connection 48 between 120 and 121, permits of adjusting the stroke of the feeder within limits.

*Wire feeding mechanism.*

The wire 32, which is of a diameter permitting it to easily telescope in tubing 33, is fed from left to right in line with the tube through perforated outer guide 38, to wire feed jaws 113, and 114, which are mounted on slide 112, reciprocated in horizontal guides 27, on carriage 5, by link 111, connected to cam lever 110, which coöperates with cam 11, splined on shaft 7. The slide 112, is normally pulled back by spring 115, against adjustable stop 116. This keeps cam lever 110 in engagement with cam 11, except when the slide is back against the stop during the passage of the most depressed portion of the cam. By adjusting stop 116, the amplitude of reciprocation of slide 112, and consequently the rate of wire feed can be regulated with exactness. Jaw 113, is fixed on slide 112, while jaw 114, can move laterally on its spindle 26, and is pulled toward jaw 113, by spring 117. These jaws are serrated transversely to the line of the wire 32, and their teeth 118, are slotted correspondingly at 119, so as to surround wire 32, as shown in Figs. 13 and 14, whether the jaws are closed or partly open.

Adjustable nuts 106, on spindle 26, control the compression of spring 117, and the consequent friction of jaws 113, 114, on the wire, the slots in the teeth being of such depth that the wire is gripped lightly just before the teeth completely intermesh.

Figures 1, 6:
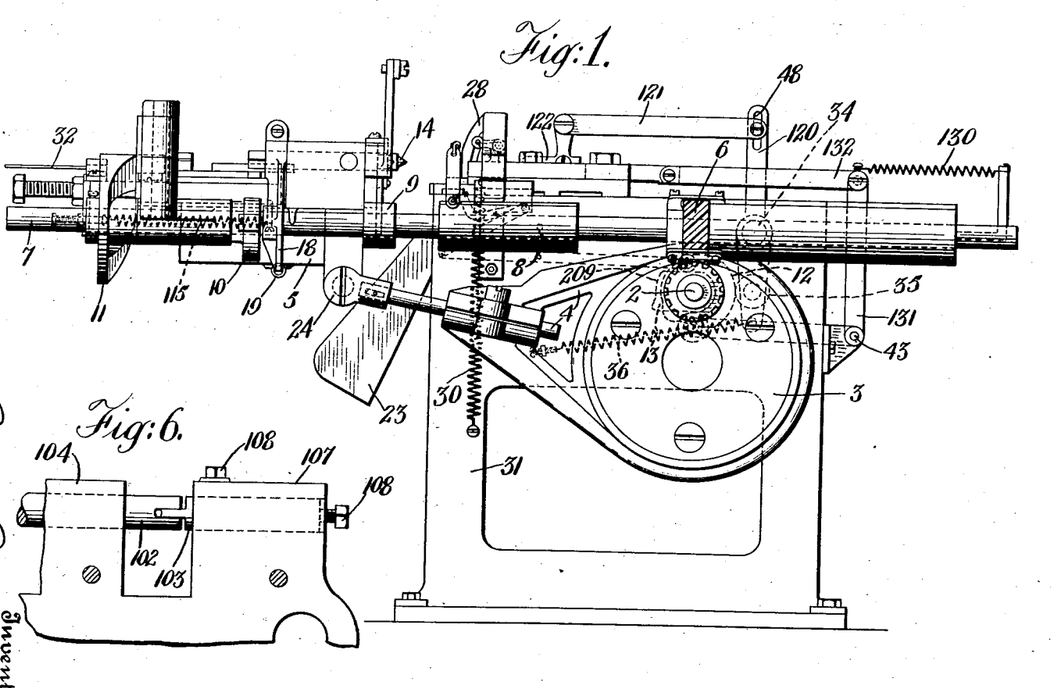
Figure 1 is a side elevation of the complete machine.
Fig. 6 is a detail front elevation of the wire grippers, parts being broken away.

The wire is held against movement during the retraction of the feed jaws by a system of grippers acting on the forward end of the wire, operated from cam 10, through bell-crank 101. The gripper pair is composed of the stationary jaw 103, mounted in housing 107 and adjustable by set screws 108 (see Fig. 6) and the movable gripper or plunger 102, mounted and sliding in housing 104. This plunger is normally held back against a flat section of bell crank shaft 101, shown in dotted lines at 105, by a spring 109, surrounding the gripper or plunger 102. A spring 19, holds the lower arm 18, of bell crank 101, against cam 10. The grippers 102, 103, intermesh as shown in Fig. 6. When bell crank shaft 101 turns, the tilting of the flat portion 105, forces plunger 102, forward against fixed gripper 103, thus firmly seizing the wire between them. 14 is a perforated two-part cone-shaped guide for the end portion of the wire projected by the reciprocating feeding device, before explained, beyond the opened grippers and through perforated guide 21.

Figure 3:
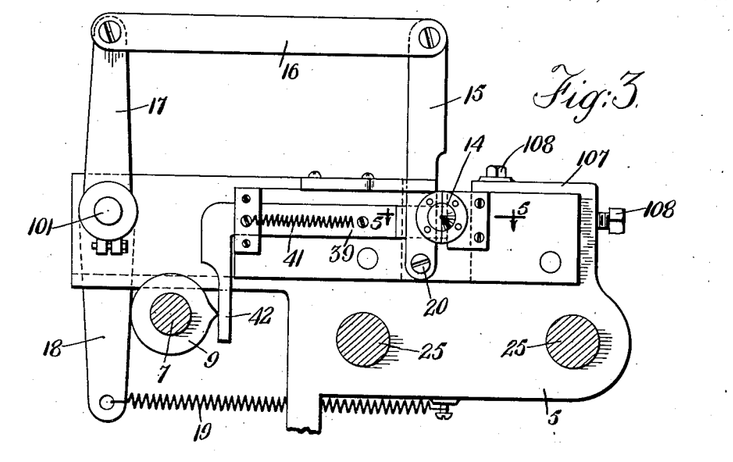
Fig. 3 is a vertical cross section on lines 3—3 of Fig. 2.
Figure 4:
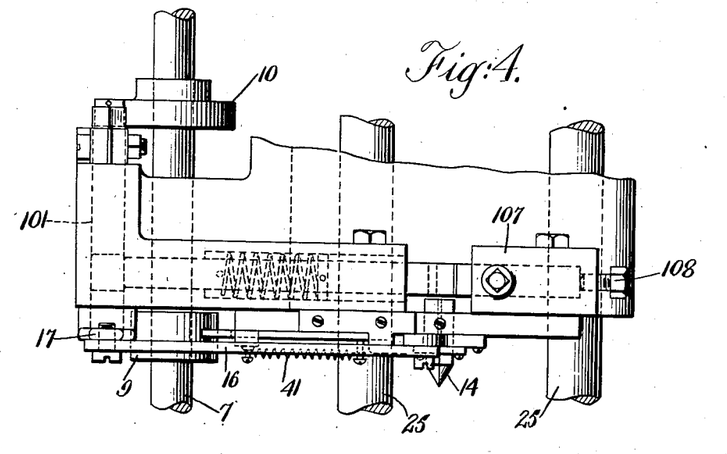
Fig. 4 is a detail plan view of parts shown in Fig. 3, other parts being broken away.
Figure 5:
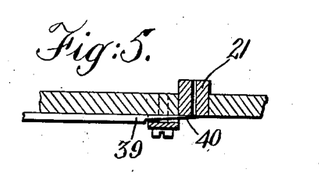
Fig. 5 is a detail, horizontal section through the wire cutting apparatus, on line 5—5 of Fig. 3, the knife being shown in full lines.

The right hand part of the cone guide (looking at Figs. 3 and 4) is stationary, while the left hand half is carried by the lever 15, pivoted at its lower end to the carriage 5, at 20, and connected at its upper end by link 16, to the upper arm 17, of the bell crank 101.

The cams 10 and 11 are so timed that when grippers 102—103 are holding the wire 32, the feed jaws 113—114, are being retracted, and pulled along the wire held by the grippers, but when the feed jaws move forward (to the right, looking at Fig. 2) the grippers open and the friction of jaws 113—114, on wire 32, is sufficient to pull it through guide 38, and push it forward through the open grippers and wire guides 21 and 14.

In some cases the wire feed jaws 113, 114, may be drawn back closed, sliding along the wire 32, which is held stationary by the greater friction of the gripper jaws 102 and 103. I prefer, however, to release the feed jaws from engagement with the wire during this return stroke of the said jaws and a mechanism for doing this is shown in the drawings and illustrated on an enlarged scale more in detail in Figs. 13, 14 and 15, where finger 200, extending from jaw 114, carries roller 201, projecting behind angle-iron 202, carried on slide 203. This slide and angle-iron carried thereby are reciprocated by lever 204, pivoted to carriage 5, at 205, and carrying a cam roller 206, coöperating with cam 210 on shaft 7. Cam 210 is so timed as to withdraw slide 203 and angle-iron 202 during the backward stroke of the wire feed jaws. This pulls jaw 114, away from 113, (roller 201 riding on the back of the angle-iron during reciprocation of jaw carrying slide 112) and opens the jaws during their backward stroke.

Tube pinching mechanism.

The operation of the tube and wire feeding devices so far described results in intermittently feeding the tube and wire toward one another, and, as the feeding devices are in line one with the other, telescoping the end of the wire into the end of the tube. It remains to pinch the telescoped sections together and cut them off so as to free the short, composite piece formed by their union into a tubulated leading-in wire.

Figure 9:
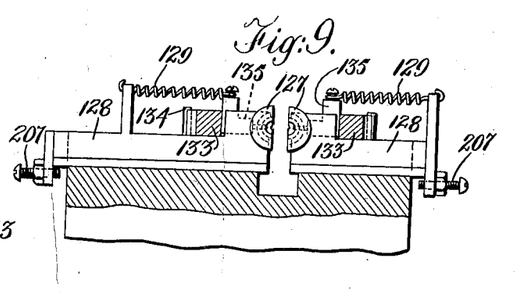
Fig. 9 is a detail vertical cross section on line 9—9 of Fig. 2 showing the tube pinching dies in open position.
Figure 10:
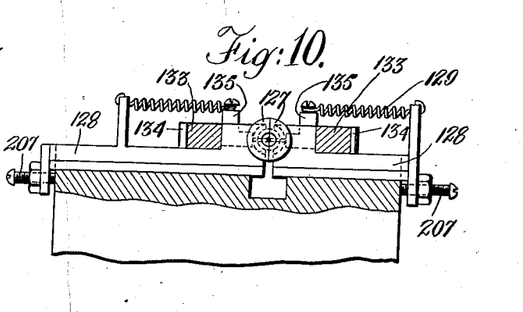
Fig. 10 is a similar view showing the dies closed in the pinching operation.
Figure 11:
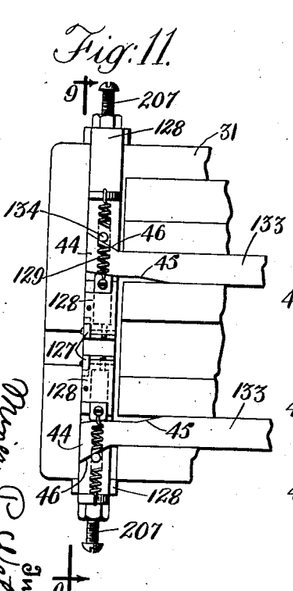
Fig. 11 is a detail plan view of the parts shown in Fig. 9.

The tube pinching mechanism is composed of a holding portion comprising the two-part die, or pair of tube holders 127, formed at the end of laterally extending horizontal slides 128, 128 (see Figs. 9 and 10), which are mounted in guides on frame 31; the pinching slides 135, 135, mounted in the slides 128, and movable longitudinally thereof (their inner, reduced ends projecting into the space between dies 127); and the mechanism for moving these slides. The slide moving mechanism consists of the following parts: A bell crank 131, pivoted at 43, on the main frame and having its lower, horizontal arm coöperating with cam 13 has its upper arms connected by links 132 to the longitudinally moving cam slides 133, 133. The spring 130, for retracting the slides and holding the bell crank in engagement with cam 13 is connected to an upper arm of bell crank 131, at one end and at the other to a fixed support as shown in Fig. 1. The cam slides 133, 133, lie between the outer ends of pincher slides 135, 135, and pins 134, 134, on slides 128, 128, and these parts are held against the opposite cam faces of slides 133, 133, by springs 129, 129. These cam faces are three in number. The exterior cam faces 46, 46, upon the retraction of slides 133, 133, engage the pins 134, 134, to retract the slides 128, 128, and open the two-part die or tube holder 127, as shown in Fig. 11. The interior cam faces 44, 44, at the extremities of the slides permit the pincher slides 135, 135, to be slightly moved apart by springs 129, 129, at the same time, as also shown in Fig. 11. The travel of slides 128, 128, may be limited by stop screws 207. The interior cam faces 45, 45, positively force the pincher slides together at the extremity of the forward travel of the cam slides 133, 133, and cause the reduced ends of the pincher slides to project into the interior space of dies, 127, and pinch or collapse the tube section against the telescoped wire section, on opposite sides.

The dies 127, have a flaring mouth 22, which receives the end of the wire and an internal shoulder 47, which serves as a stop against which the end of the nickel tube 33, abuts. The cone wire-guide 14, travels up to the die 127, when the wire-feed carriage 5, comes forward, and centers with the end of the tube 33, held in the die, thus guiding wire 32 into the end of the tube and insuring the desired telescoping action when the wire feeding action of carriage 5, and the mechanism carried thereby reaches its final stage.

Cutting mechanism.

The wire, 32, may be cut by any suitable knife such as 40, carried on the end of slide 39, which has a downwardly projecting arm 42, coöperating with cam 9. A spring 41, tends to retract the knife slide 39, and hold arm 42, against the cam. The knife shears the wire along the front face of wire guide 21, at the moment the cone guide 14, opens and the gripping devices open, so that the cut off piece, which has been joined to a cut off section of tube, may fall away from the mechanism. Cams 9, 10, 210 and 11 are all splined on shaft 7, and travel back and forth with carriage 5.

Figure 16:
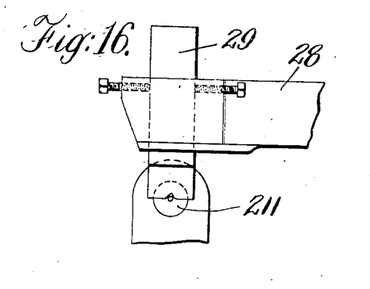
Fig. 16 is a detail view of the V-shaped tube-cutting knife, parts being broken away.
Figure 17:
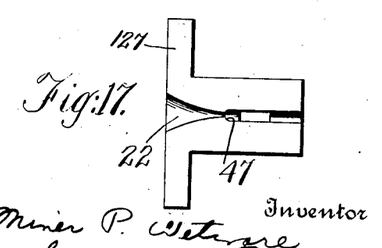
Fig. 17 is an enlarged detail horizontal sectional view of the tube-holding dies.
Figure 18:
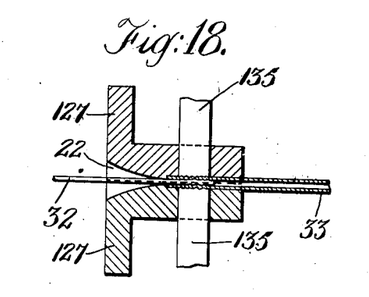
Fig. 18 is a vertical elevation of one die, showing its face.
Figure 19:
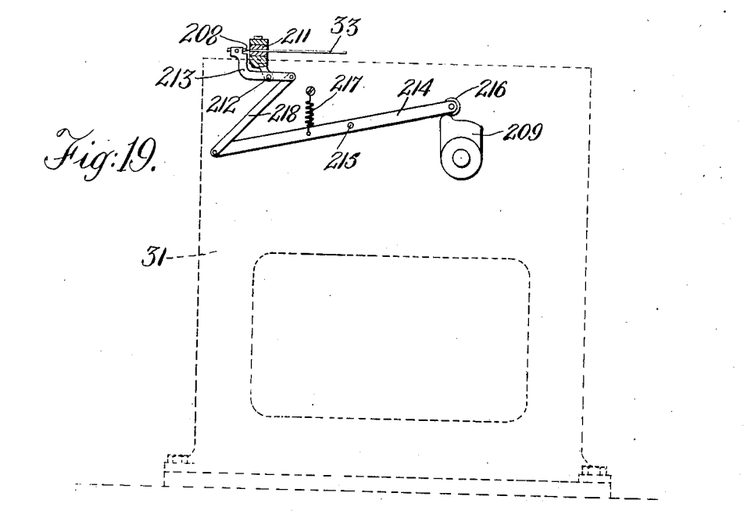
Fig. 19 is a detail of the tube-reaming attachment.
Figure 20:
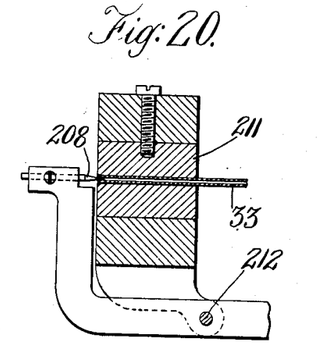
Fig. 20 is an enlarged detail, vertical section of parts thereof.

The cutting of the tube 33, is, however, a more delicate operation, as its walls must not be collapsed by the cutting operation. I accomplish this by employing a reciprocating inverted V-shaped cutter 29, (see Fig. 16) the inner surfaces of the V being sharpened to a cutting edge. This produces a drawing cut on the tube so that little or no collapsing action results. The cutter 29, is suspended from cam lever 28, the outer end of which is intermittently forced up and the inner end down, by cam 8. The knife is retracted by spring 30. The cut, telescoped tube and wire sections, forming the completed leading-in wire, are allowed to fall freely into chute 23, by the withdrawal of wire feed carriage 5, and the opening of die 127.

The reamer 208, is a tapering pin mounted on a reciprocating mechanism by which it may be projected between the halves of the two-part die 127 after they have been separated to allow the completed, telescoped wire and tube section to drop. It coöperates with the tube guide 211, (see Figs. 7, 8, 19 and 20) and expands the tube end held by said guide to the full diameter of the bore of the guide passage. As shown, the reamer carrier 213, is pivoted at 212 to the main frame and operated from cam 209, on main shaft 2. The cam is so shaped as to quickly swing the reamer up into engagement with the tube, give it a final thrust, and as quickly withdraw it, so that the dies 127 may thereafter close and the reamed tube end be fed forward into the dies to meet the wire. The particular operating mechanism shown comprises a lever 214, pivoted to the frame at 215, having the cam roller 216, which is held against the cam by spring 217 and connected to reamer support 213, by link 218.

The timing of the parts is as follows, starting at that point in the cycle where the two parts of die 127, are closed and ready to receive the end of the tube 33, between them.

Timing.

Figure 12:
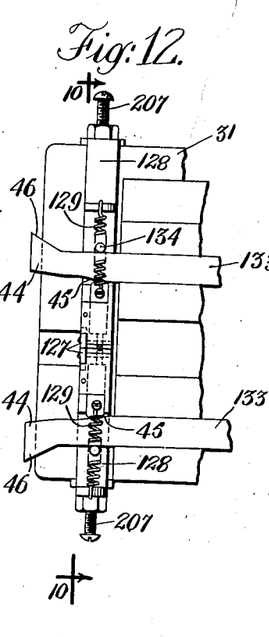
Fig. 12 is a similar view corresponding to Fig. 10.

(1) Dies 127, are initially held closed by springs 129, the cam slides 133, having been forced forward in position shown in Fig. 12, to permit this closing of the dies.

(2) The nickel tubing 33, is next fed forward into the dies by the feeder 122, and butts up against shoulder 47 therein.

(3) Wire is next fed into the tube by the wire feed slide 112, the wire being guided by cone guide 14, and the flaring outer mouth 22, of the dies, the wire grippers 102—103 having been opened to allow the wire to be fed forward, and closing on it as the carriage 5, moves toward the dies.

(4) The tube is pinched on the wire by action of the pincher slides 135, which are driven in by the completed forward stroke of cam slides 133.

(5) The two-part die is next opened by the full retraction of the cam slides 133, and of the tube pincher slides 135.

(6) After the die is opened the nickel tube 33, is cut by a down stroke of the inverted V-shaped cutter 29, and after retraction of the cutter 29, the reamer 208 is forced into the end of the remaining tube to reopen or expand the same if it has been partly collapsed by the knife action. At the same time the wire 32, is still gripped by wire grippers 102—103, during retraction of wire feed slide 112, the jaws 113, 114, of which move back over the wire to grip it in a new place, preparatory to feeding a new length forward.

(7) The wire cutter knife 40, on the end of slide 39, advances while the wire is held by the grippers and cuts off the finished, telescoped section of wire and tube.

(8) Finally, a complete retraction of wire feed carriage 5, coincident with opening of the cone guide and the wire grippers, permits the cut, tubulated leading-in wire to fall down between the separated parts of the machine to chute 23, or any suitable receptacle beneath, dies 127 close, and the above described cycle of operations is repeated.

The product of the above described operation of the machine is a piece of wire an inch or so long, on one end of which is pinched a section of nickel tubing, with the end of the tubing projecting to form a cup. Into these cups on the ends of two of the wires, the two ends of a tungsten filament may be pinched or fused, and the wires and bases of the cups then sealed into the glass stem of an incandescent lamp.

Having described my invention, I claim:

1. In an apparatus for making leading-in wires the combination with the main frame of a device mounted thereon adapted to intermittently feed a tube in one direction, a second device adapted to intermittently feed a wire in the opposite direction into said tube, reciprocating mechanism for pinching together the telescoped sections of tube and wire mechanism for cutting off said telescoped sections, and driving mechanism mounted on the frame and operatively connected to each of said feeding, cutting and pinching mechanisms.

2. An apparatus such as set out in claim 1, combined with a carriage separate from the support for the tube manipulating devices on which carriage the wire manipulating devices are mounted, and means for causing reciprocating motion between said carriage and the tube manipulating devices.

3. In an apparatus for making leading-in wires the combination, with the main frame, and means for feeding, cutting and pinching sections of metal tube, of a reciprocating frictional feeding device for a wire to be telescoped into the tube, a set of laterally movable wire grippers, means for closing said grippers on the wire when the feeding device is being retracted and for separating them when the feeding is advancing, together with a laterally reciprocating knife located adjacent to the grippers on the side thereof opposite to that on which the feeding device is located, and means for reciprocating the knife across the path of the wire.

4. An apparatus such as set out in claim 3, combined with a perforated cone shaped guide for the wire located beyond the knife on the line of travel of the wire.

5. In an apparatus for making leading-in wires for incandescent lamps and the like the combination, with means for feeding one end of a wire part way into one end of a tube, of transversely reciprocating punching devices for collapsing on the wire a portion of the overlapping tube, means for cutting off the wire a short distance from the end of the tube, and means for cutting off the tube a short distance from the end of the wire.

6. A combination such as described in claim 5, in which the pinching devices comprise opposing, transversely reciprocating die-carrying slides adapted to hold the tube between them, and reciprocating plungers mounted in, and parallel to the axes of, said slides, arranged to press against the portion of the tube within the dies.

7. A combination such as described in claim 5, in which the pinching devices comprise opposing, transversely reciprocating, die-carrying slides adapted to hold the tube between them, and reciprocating plungers mounted in, and parallel to the axes of, said slides, arranged to press against the portion of the tube within the dies, together with cam slides reciprocaing in a direction parallel to the path of the tube, projections on the die carrying slides and pinching plungers and yielding means holding said projections against the cam faces of said slides.

8. In a machine of the character described, a tube holding and pinching device comprising in combination opposite reciprocating die carrying members, pinching slides telescoped into said members and movable axially therethrough, transverse projections from both reciprocating members and pinching slides, a tension spring connecting the projection on each reciprocating member with that of the corresponding pinching slide, a cam slide located and movable between each such pair of projections and having cam faces coöperating with each, and means for simultaneously reciprocating said cam slides, whereby the pairs of die members are first brought together to receive the end of a tube, the pinching slides being separated to permit a tube to be fed between them, the pinching slides next driven positively against the portion of the tube so held, and the die members and pinchers finally separated to permit the pinched tube to drop out.

9. An apparatus such as set forth in claim 8 combined with means for feeding a section of wire into said tube section, and for cutting off both tube and wire sections after the pinching operation is completed.

10. In an apparatus for telescoping a wire into a tube the combination, with oppositely grooved dies for holding the tube and means for reciprocating them, of a cone shaped guide for the wire in line with the tube when held by its dies and means for feeding the wire through said guide into the tube sections held in the dies.

11. In an apparatus for telescoping a wire into a tube, the combination, with a tube guide, means for feeding the tube into said guide, and a knife for cutting the tube transversely at the end of the guide, of a tapering pin adapted to enter and expand the tube end so cut and mechanism for forcing said pin into the tube end after the cutting operation.

12. In an apparatus for telescoping a wire into a tube the combination, with oppositely grooved dies for holding the tube and means for reciprocating them, of a cone shaped guide for the wire in line with the tube when held by its dies and means for feeding the wire through said guide into the tube section held in the dies and for causing relative reciprocation between the wire guide and tube dies, the faces of the dies being provided with flaring recesses leading to their wire-holding grooves, and adapted to receive the above mentioned cone shaped wire guide when the two elements approach one another.

MINER P. WETMORE.